(12) United States Patent
Nishimoto et al.

(10) Patent No.: US 10,100,685 B2
(45) Date of Patent: Oct. 16, 2018

(54) HYDRAULIC SUPPLY DEVICE FOR VALVE STOPPING MECHANISM

(71) Applicant: MAZDA MOTOR CORPORATION, Hiroshima (JP)

(72) Inventors: Toshiaki Nishimoto, Hiroshima (JP); Yasushi Nakahara, Higashihiroshima (JP); Hiroshi Takahashi, Aki-gun (JP); Yohei Suzuki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 70 days.

(21) Appl. No.: 15/107,835

(22) PCT Filed: Dec. 12, 2014

(86) PCT No.: PCT/JP2014/083045
§ 371 (c)(1),
(2) Date: Jun. 23, 2016

(87) PCT Pub. No.: WO2015/098581
PCT Pub. Date: Jul. 2, 2015

(65) Prior Publication Data
US 2016/0319707 A1    Nov. 3, 2016

(30) Foreign Application Priority Data

Dec. 27, 2013   (JP) ................................ 2013-271758

(51) Int. Cl.
*F01L 1/24* (2006.01)
*F01M 1/02* (2006.01)
(Continued)

(52) U.S. Cl.
CPC ............ *F01L 1/2405* (2013.01); *F01L 1/185* (2013.01); *F01L 13/0005* (2013.01); *F01M 1/02* (2013.01);
(Continued)

(58) Field of Classification Search
CPC ... F01L 1/2405; F01L 2001/2444; F01L 1/46; F01L 2001/467; F01L 13/0005;
(Continued)

(56) References Cited

U.S. PATENT DOCUMENTS 4,380,219 A    4/1983   Walsh
4,858,574 A    8/1989   Fukuo et al.
(Continued)

FOREIGN PATENT DOCUMENTS

JP    S60-065308 U    5/1985
JP    S63-167015 A    7/1988
(Continued)

OTHER PUBLICATIONS

JP Office Action dated Mar. 14, 2017 from corresponding JP Appl No. 2013-271758, with English translation, 8 pp.
(Continued)

*Primary Examiner* — Jorge Leon, Jr.
(74) *Attorney, Agent, or Firm* — Studebaker & Brackett PC (57) ABSTRACT

A hydraulic supply device for a valve stopping mechanism includes: a specific hydraulic oil supply passage which constantly supplies hydraulic oil, a valve stopping mechanism incorporated in a cylinder head, and configured to stop at least one of an intake valve and an exhaust valve, a valve stopping oil passage which supplies hydraulic oil to the valve stopping mechanism, a control valve which controls the supply of hydraulic oil to the valve stopping oil passage, and a communication oil passage which communicates between the valve stopping oil passage and the specific hydraulic oil supply passage, and provided with a restrictor therebetween. The specific hydraulic oil supply passage is connected to an oil supply portion for a portion to be lubricated or for a portion to be cooled in the engine at a
(Continued)

position downstream of a connection position with respect to the communication oil passage in an oil supply direction.

6 Claims, 6 Drawing Sheets

(51) Int. Cl.

| | | |
|---|---|---|
| *F01M 1/06* | (2006.01) | |
| *F01M 9/10* | (2006.01) | |
| *F02D 13/06* | (2006.01) | |
| *F01L 1/18* | (2006.01) | |
| *F02D 17/02* | (2006.01) | |
| *F01L 1/46* | (2006.01) | |
| *F01L 13/00* | (2006.01) | |
| *F01L 1/053* | (2006.01) | |
| *F01L 1/344* | (2006.01) | |

(52) U.S. Cl.
CPC ............. *F01M 1/06* (2013.01); *F01M 9/10* (2013.01); *F02D 13/06* (2013.01); *F02D 17/02* (2013.01); *F01L 1/46* (2013.01); *F01L 2001/0537* (2013.01); *F01L 2001/2444* (2013.01); *F01L 2001/34496* (2013.01); *F01L 2013/001* (2013.01); *F01L 2105/00* (2013.01); *F01L 2800/08* (2013.01); *F01L 2810/01* (2013.01); *F01L 2810/02* (2013.01); *Y02T 10/18* (2013.01)

(58) Field of Classification Search
CPC ............. F01L 2013/001; F01L 2800/08; F01L 2810/01; F01L 2810/02
USPC .......... 123/90.12, 90.13, 90.16, 90.34, 90.46
See application file for complete search history.

(56) References Cited

U.S. PATENT DOCUMENTS

| | | | |
|---|---|---|---|
| 5,655,487 A | 8/1997 | Maas et al. | |
| 6,138,636 A | 10/2000 | Kohno et al. | |
| 2002/0014217 A1* | 2/2002 | Church | F01L 1/146 123/198 F |
| 2003/0075129 A1* | 4/2003 | Spath | F01L 1/146 123/90.16 |
| 2004/0244751 A1* | 12/2004 | Falkowski | F01L 1/146 123/90.55 |
| 2005/0120989 A1* | 6/2005 | Geyer | F01L 1/14 123/90.59 |
| 2008/0035085 A1 | 2/2008 | Hendriksma | |
| 2009/0308339 A1* | 12/2009 | Hendriksma | F01L 1/14 123/90.46 |
| 2010/0192889 A1* | 8/2010 | Radulescu | F01L 1/185 123/90.45 |
| 2012/0067312 A1* | 3/2012 | Lee | F01L 1/2405 123/90.16 |
| 2012/0067313 A1* | 3/2012 | Choi | F01L 13/0031 123/90.16 |
| 2014/0202406 A1* | 7/2014 | Nakamura | F01L 1/46 123/90.15 |
| 2015/0090206 A1* | 4/2015 | Tani | F01L 1/053 123/90.12 |
| 2015/0167507 A1* | 6/2015 | Aimo Boot | F01L 1/2405 74/569 |

FOREIGN PATENT DOCUMENTS

| | | |
|---|---|---|
| JP | H02-207111 A | 8/1990 |
| JP | H05-288018 A | 11/1993 |
| JP | H09-506689 A | 6/1997 |
| JP | H11-229836 A | 8/1999 |
| JP | H11-336577 A | 12/1999 |
| JP | 3607261 B2 | 1/2005 |
| JP | 2010-024982 A | 2/2010 |
| WO | 2007/060096 A1 | 5/2007 |

OTHER PUBLICATIONS

International Search Report issued in PCT/JP2014/083045; dated Mar. 17, 2015.
Written Opinion issued in PCT/JP2014/083045; dated Mar. 17, 2015.

* cited by examiner

HYDRAULIC SUPPLY DEVICE FOR VALVE STOPPING MECHANISM

TECHNICAL FIELD

The present invention relates to a hydraulic supply device for a valve stopping mechanism in a multi-cylinder engine capable of performing a reduced-cylinder operation of deactivating a part of the cylinders of the engine.

BACKGROUND ART

In the multi-cylinder engine as described above, control of stopping an operation of an intake valve and an exhaust valve of a cylinder to be deactivated is executed when the engine is shifted to a reduced-cylinder operation. In view of the above, the engine is provided with a valve stopping mechanism for stopping the intake valve and the exhaust valve.

For instance, Patent Literature 1 discloses a valve stopping mechanism, in which a locker arm for cam lifting and a locker arm for valve driving are adjacent to each other and supported on a locker shaft, and the locker arms are switched between a connected state and a disconnected state by a hydraulic pressure. Specifically, in a state that the locker arms are connected to each other, the locker arms integrally swing around the locker shaft, as a lift cam (camshaft) is rotated, and an intake valve and an exhaust valve are operated as the locker arm for valve driving swings. On the other hand, in a state that the locker arms are disconnected from each other, only the locker arm for cam lifting swings as the lift cam (camshaft) is rotated, and the operation of the intake valve and the exhaust valve is stopped.

In the valve stopping mechanism, when the engine is in an all-cylinder operation mode, hydraulic oil is supplied to a second oil passage in a state that supply of hydraulic oil to a first oil passage is stopped, and the locker arms are kept in a connected state. When the engine is in a cylinder deactivation mode, hydraulic oil is supplied to the first oil passage in a state that supply of hydraulic oil to the second oil passage is stopped, and the connected state between the locker arms is released.

In the aforementioned configuration, when an all-cylinder operation mode is continued for a long period of time, the amount of hydraulic oil in the first oil passage may decrease because supply of hydraulic oil to the first oil passage is stopped for a long period of time, and a response delay may occur when the engine is shifted to a cylinder deactivation mode.

Further, when the engine is left in a stopped state for a long period of time, return oil from the first oil passage may cause intrusion of air into the first oil passage, or air dissolved in hydraulic oil may turn into gas. As a result, air may stagnate in the first oil passage. In such a case, when the engine is driven next time, the valve stopping mechanism may be operated due to the stagnated air against a driver's intention, and the valve stopping mechanism may be erroneously operated.

Therefore, in an engine provided with a valve stopping mechanism, there is a demand for suppressing a phenomenon such as a response delay as described above, not to mention the disclosure of Patent Literature 1.

CITATION LIST

Patent Literature

Patent Literature 1: Japanese Patent No. 3607261

SUMMARY OF INVENTION

In view of the above, an object of the invention is to provide a technique that enables to appropriately operate a valve stopping mechanism with enhanced responsiveness.

A hydraulic supply device for a valve stopping mechanism of the invention includes a specific hydraulic oil supply passage which constantly supplies hydraulic oil during driving of an engine, a valve stopping mechanism incorporated in a cylinder head of the engine, and configured to stop at least one of an intake valve and an exhaust valve by a hydraulic operation, a valve stopping oil passage which supplies hydraulic oil to the valve stopping mechanism, a control valve which controls the supply of hydraulic oil to the valve stopping oil passage during driving of the engine, and a communication oil passage which communicates between the valve stopping oil passage and the specific hydraulic oil supply passage, and provided with a restrictor therebetween. The specific hydraulic oil supply passage is connected to an oil supply portion for a portion to be lubricated or for a portion to be cooled in the engine at a position downstream of a connection position with respect to the communication oil passage in an oil supply direction.

DESCRIPTION OF EMBODIMENTS

In the following, a preferred embodiment of the invention is described in details referring to the accompanying drawings.

<Configuration of Engine>

Figure 1:
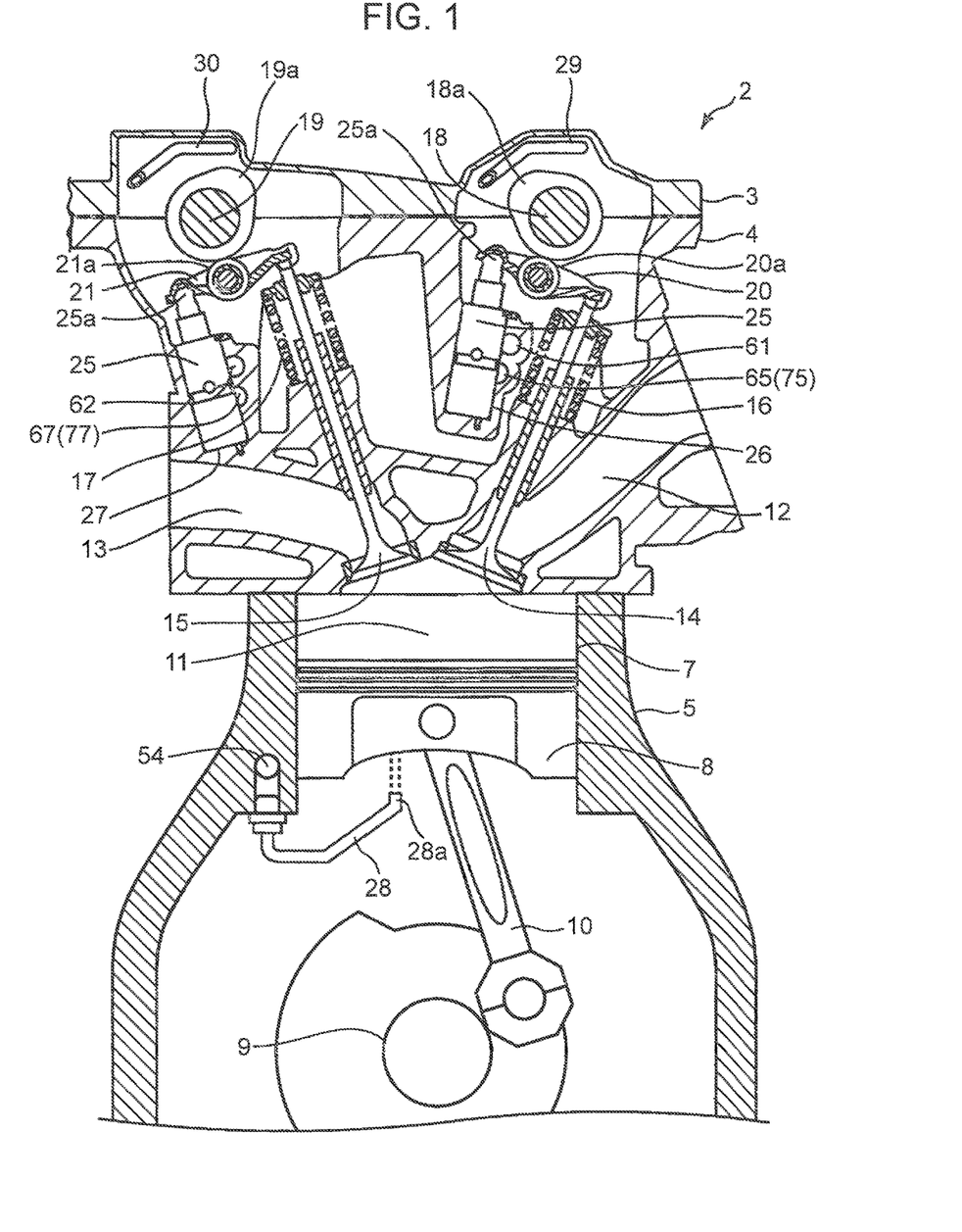
FIG. 1 is a sectional view illustrating a schematic configuration of a multi-cylinder engine to which a hydraulic supply device for a valve stopping mechanism embodying the invention is applied.

FIG. 1 illustrates a multi-cylinder engine 2 (hereinafter, simply called as an engine 2) to which a hydraulic supply device for a valve stopping mechanism of the invention is applied. The engine 2 is an in-line 4-cylinder gasoline engine in which a first cylinder, a second cylinder, a third cylinder, and a fourth cylinder are arranged in this order in series in a direction perpendicular to the plane of FIG. 1. The engine 2 is installed in a vehicle such as an automobile. In this example, the cylinder array direction of the engine 2 is called as the engine front-rear direction as necessary, and the direction orthogonal to the cylinder array direction is called as the engine width direction as necessary. Further, the cylinders are called as the first cylinder, the second cylinder, the third cylinder, and the fourth cylinder in this order from the front-most side of the engine 2.

The engine 2 includes a cam cap 3, a cylinder head 4, a cylinder block 5, a crankcase (not illustrated), and an oil pan 6 (see FIG. 3), which are vertically connected to each other. The cylinder block 5 is formed with four cylinder bores 7. A piston 8 is slidably movably accommodated in each of the cylinder bores 7. A combustion chamber 11 is formed by the piston 8, the cylinder bore 7, and the cylinder head 4 for each cylinder. Each of the pistons 8 is connected to a crankshaft 9, which is rotatably supported on the crankcase, via a corresponding connecting rod 10.

The cylinder head 4 is formed with an intake port 12 and an exhaust port 13 opened toward each of the combustion chambers 11. An intake valve 14 for opening and closing the intake port 12 is mounted in the intake port 12, and an exhaust valve 15 for opening and closing the exhaust port 13 is mounted in the exhaust port 13.

The intake valve 14 (exhaust valve 15) is urged in a direction (upward direction in FIG. 1) of closing the intake port 12 (exhaust port 13) by a return spring 16 (17). The intake port 12 (exhaust port 13) is opened when the intake valve 14 (exhaust valve 15) is pressed by a cam portion 18a (19a) formed on the outer periphery of a camshaft 18 (19). Specifically, as the camshaft 18 (19) is rotated, a cam follower 20a (21a) disposed substantially at the middle of a swing arm 20 (21) is pressed down by the cam portion 18a (19a). Then, the swing arm 20 (21) swings around a top portion of a pivot mechanism provided at one end side of the swing arm 20 (21). As the swing arm 20 (21) swings, the other end of the swing arm 20 (21) presses down the intake valve 14 (exhaust valve 15) against the urging force of the return spring 16 (17). Thus, the intake port 12 and the exhaust port 13 are opened.

Figure 4:
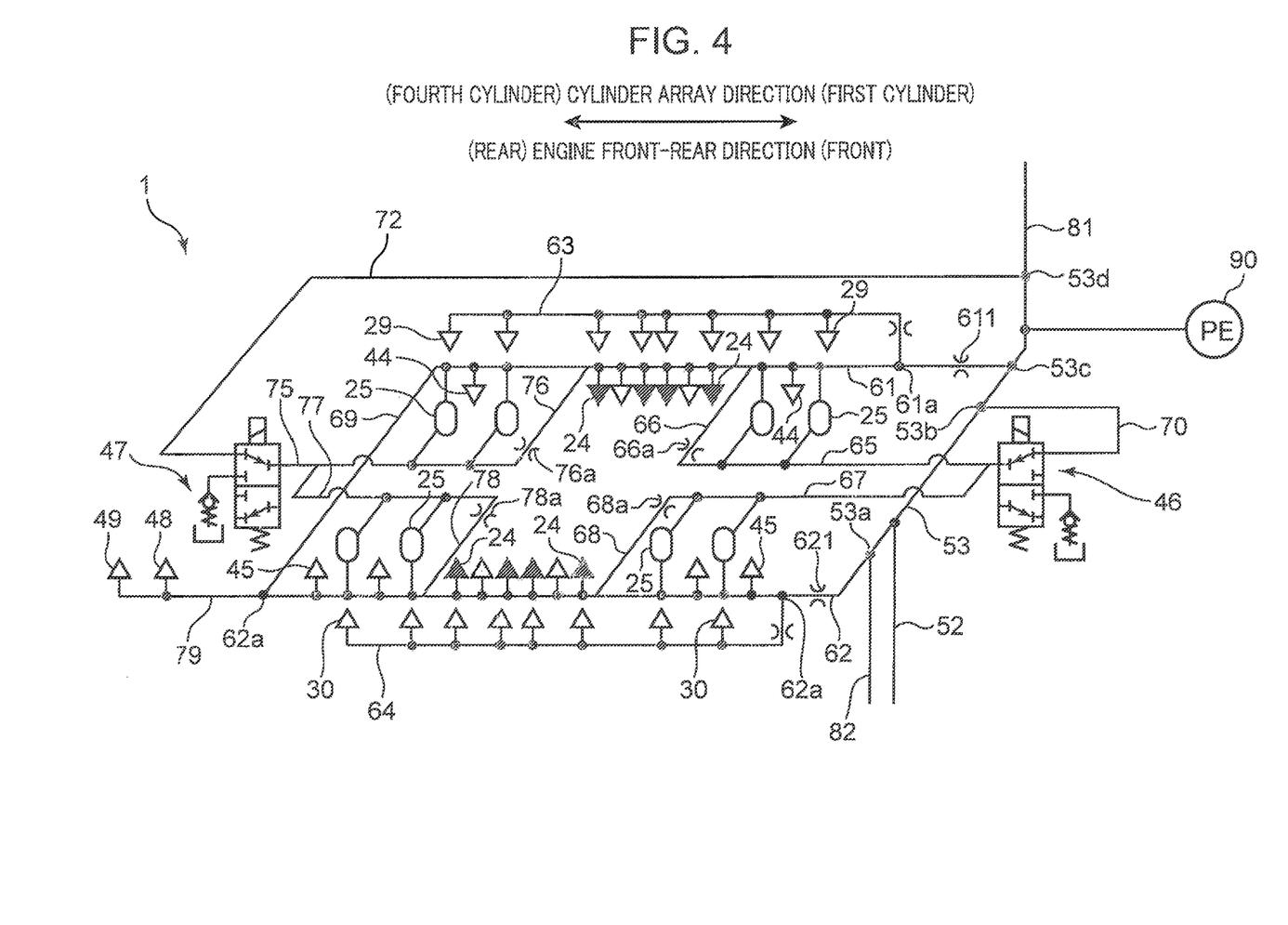
FIG. 4 is an enlarged view of FIG. 3.

A hydraulic lash adjuster 24 is provided as the pivot mechanism of the swing arm 20 (21) for the second and third cylinders that are disposed at the middle of the first to fourth cylinders of the engine 2 (see FIG. 4). The hydraulic lash adjuster 24 (hereinafter, called as an HLA 24) is configured to automatically adjust the valve clearance to zero by a hydraulic pressure.

On the other hand, as illustrated in FIG. 1 and FIG. 4, a hydraulic lash adjuster 25 provided with a valve stopping mechanism (hereinafter, called as a valve-stopping-mechanism-mounted HLA 25, or simply called as an HLA 25) is provided as the pivot mechanism of the swing arm 20 (21) for the first and fourth cylinders that are disposed at both ends of the first to fourth cylinders in the cylinder array direction. The valve-stopping-mechanism-mounted HLA 25 is configured to automatically adjust the valve clearance to zero, as well as the HLA 24. However, the HLA 25 has, in addition to the aforementioned function, a function of switching between a state in which operations of the intake valve 14 and the exhaust valve 15 are allowed, and a state in which operations of the intake valve 14 and the exhaust valve 15 are stopped. According to this configuration, the operation mode of the engine 2 is switchable between an all-cylinder operation mode in which the intake valves 14 and the exhaust valves 15 of all the cylinders are operated (the intake valves 14 and the exhaust valves 15 are allowed to perform opening and closing operations), and a reduced-cylinder operation mode in which the operations of the intake valves 14 and the exhaust valves 15 of the first and fourth cylinders are stopped (opening and closing operations of the intake valves 14 and the exhaust valves 15 are stopped), and only the operations of the intake valves 14 and the exhaust valves 15 of the second and third cylinders are allowed.

The cylinder head 4 is formed with a mounting hole 26 (27) for receiving and mounting a lower end of the valve-stopping-mechanism-mounted HLA 25 at an intake-side portion (an exhaust-side portion) for each of the first and fourth cylinders. Likewise, the cylinder head 4 is formed with a mounting hole 26 (27) for receiving and mounting a lower end of the HLA 24 at an intake-side portion (an exhaust-side portion) for each of the second and third cylinders. The cylinder head 4 is further formed with an oil passage 61 extending in the cylinder array direction over the first to fourth cylinders, and communicating with the mounting holes 26 for receiving the intake-side HLAs 24 (25); and an oil passage 65 (75) extending in the cylinder array direction at a position corresponding to the first and fourth cylinders, and communicating with the mounting holes 26 for receiving the intake-side valve-stopping-mechanism-mounted HLAs 25. The cylinder head 4 is further formed with an oil passage 62 extending in the cylinder array direction over the first to fourth cylinders, and communicating with the mounting holes 27 for receiving the exhaust-side HLAs 24 (25); and an oil passage 67 (77) extending in the cylinder array direction at a position corresponding to the first and fourth cylinders, and communicating with the mounting holes 27 for receiving the exhaust-side valve-stopping-mechanism-mounted HLAs 25.

Among the oil passages 61, 62, 65 (75), and 67 (77), the oil passage 61 (62) is configured to supply oil (hydraulic oil) to the HLAs 24 mounted in the mounting holes 26 (27), and to a below-mentioned pivot mechanism main body 25a of each of the valve-stopping-mechanism-mounted HLAs 25. The HLAs 24, and the pivot mechanism main bodies 25a of the valve-stopping-mechanism-mounted HLAs 25 are configured to automatically adjust the valve clearance to zero by a hydraulic pressure. On the other hand, the oil passages 65 (75) and 67 (77) are configured to supply oil to a below-mentioned valve stopping mechanism 25b (see FIG. 2A to FIG. 2C) of each of the valve-stopping-mechanism-mounted HLAs 25, which are mounted in the mounting holes 26 (27). The oil passages 61, 62, 65 (75), and 67 (77) will be described later in detail.

The cylinder block 5 is formed with a main gallery 54 extending in the cylinder array direction within an exhaust-side side wall of each of the cylinder bores 7. An oil jet 28 for cooling the corresponding piston 8 communicates with the main gallery 54 at a position near the lower portion of the main gallery 54 for each of the pistons 8. Each of the oil jets 28 has a shower nozzle 28a disposed below the corresponding piston 8. Oil (cooling oil) is sprayed onto the back surface of the piston 8 through the shower nozzle 28a.

Further, shower nozzles 29 (30) are disposed above the camshaft 18 (19). Each of the shower nozzles 29 (30) is configured to drop oil (lubricating oil) onto the corresponding cam portion 18a (19a) of the camshaft 18 (19) located below the shower nozzle 29 (30), and onto a contact portion between the corresponding swing arm 20 (21) and the corresponding cam follower 20a (21a).

<Description on Valve-Stopping-Mechanism-Mounted HLA 25>

Figure 2A:
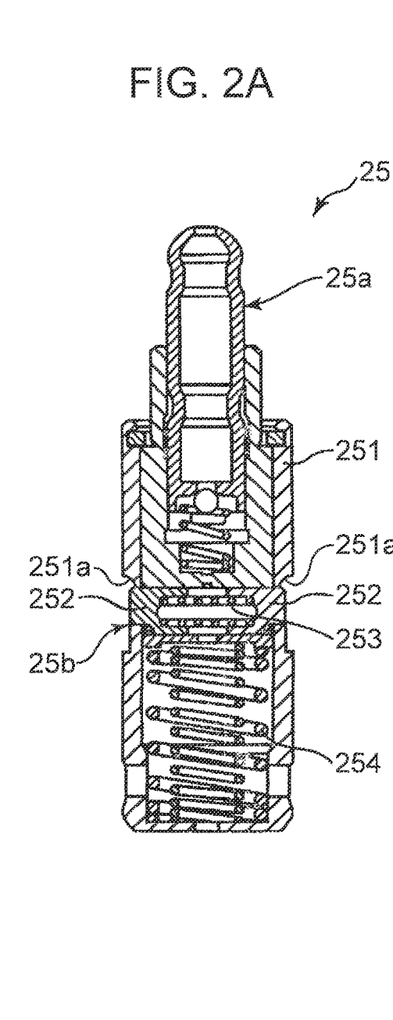
FIG. 2A is a sectional views illustrating a configuration and operation states of a hydraulically operated valve stopping mechanism (a locked state of a pivot mechanism main body)
Figure 2B:
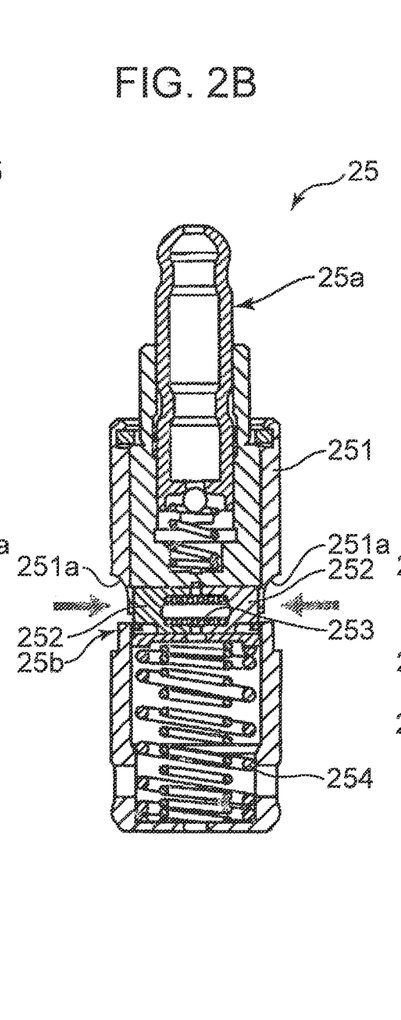
FIG. 2B is a sectional view illustrating a configuration and operation states of a hydraulically operated valve stopping mechanism (a lock released state of the pivot mechanism main body)
Figure 2C:
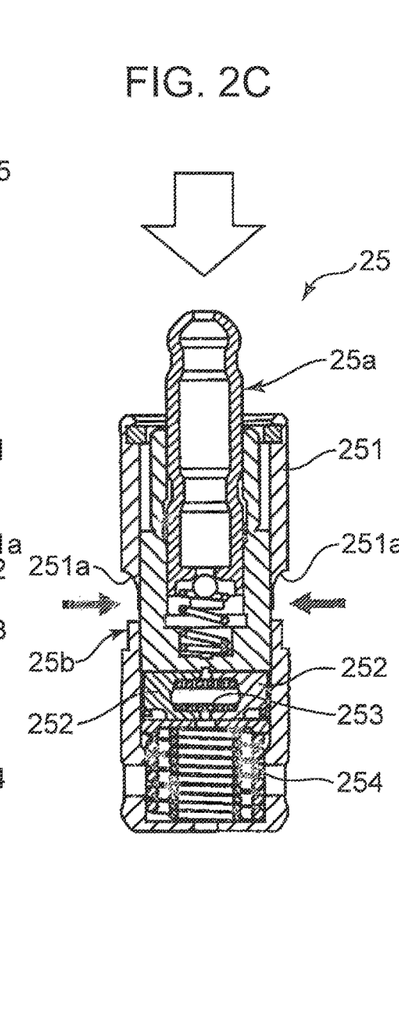
FIG. 2C is a sectional view illustrating a configuration and operation states of a hydraulically operated valve stopping mechanism (a state that the pivot mechanism main body is pressed in the lock released state)

The valve stopping mechanism 25b of the valve-stopping-mechanism-mounted HLA 25 is described referring to FIG. 2A to FIG. 2C. As described above, the valve stopping mechanism 25b switches the intake valve 14 (exhaust valve 15) between a state in which the operation of the intake valve 14 (exhaust valve 15) is allowed, and a state in which the operation of the intake valve 14 (exhaust valve 15) is stopped. According to this configuration, the valve stopping mechanisms 25b switch the operation state of the engine 2 between an all-cylinder operation mode in which the intake valves 14 and the exhaust valves 15 of all the cylinders are operated (the intake valves 14 and the exhaust valves 15 are allowed to perform opening and closing operations), and a reduced-cylinder operation mode in which the operations of the intake valves 14 and the exhaust valves 15 of the first and fourth cylinders are stopped (the opening and closing operations of the intake valves 14 and the exhaust valves 15 are stopped), and only the intake valves 14 and the exhaust valves 15 of the second and third cylinders are operated. In other words, when the engine is operated in an all-cylinder operation mode, the valve stopping mechanisms 25b are stopped so that the opening and closing operations of the intake valves 14 and the exhaust valves 15 of all the cylinders including the first and fourth cylinders are performed. On the other hand, when the engine 2 is operated in a reduced-cylinder operation mode, the valve stopping mechanisms 25b are hydraulically operated so that the opening and closing operations of the intake valves 14 and the exhaust valves 15 of the first and fourth cylinders out of all the cylinders are stopped.

In the embodiment, as described above, the valve stopping mechanism 25b is provided in the valve-stopping-mechanism-mounted HLA 25. In other words, the valve-stopping-mechanism-mounted HLA 25 is provided with the pivot mechanism main body 25a and the valve stopping mechanism 25b. The pivot mechanism main body 25a is configured to automatically adjust the valve clearance to zero by a hydraulic pressure, and has substantially the same configuration as the HLA 24.

As illustrated in FIG. 2A, the valve stopping mechanism 25b is provided with a bottomed outer cylinder 251 for slidably accommodating the pivot mechanism main body 25a in the axis direction, a pair of locking pins 252 configured to retractably project from two through-holes 251a formed in a side wall of the outer cylinder 251 to face each other, a lock spring 253 which urges the paired locking pins 252 radially outwardly, and a lost motion spring 254 disposed between the inner bottom portion of the outer cylinder 251 and the bottom portion of the pivot mechanism main body 25a to urge the pivot mechanism main body 25a upwardly. The paired locking pins 252 are displaceable between an away position at which the paired locking pins 252 are respectively received in the through-holes 251a in a state that tip ends of the paired locking pins 252 project outwardly of the outer cylinder 251, and a proximity position at which the paired locking pins 252 escape from the through-holes 251a into the inside of the outer cylinder 251. According to this configuration, when the paired locking pins 252 are disposed to the away position by the urging force of the lock spring 253 in a state that the pivot mechanism main body 25a projects upwardly of the outer cylinder 251, up and down movement of the pivot mechanism main body 25a is restrained (this state is called as a locked state of the pivot mechanism main body 25a). On the other hand, when the paired locking pins 252 are disposed to the proximity position against the spring force of the lock spring 253 by a hydraulic pressure to be applied through the oil passage 61 (62), the locking pins 252 are allowed to move up and down within the outer cylinder 251 together with the pivot mechanism main body 25a (this state is called as a lock released state of the pivot mechanism main body 25a).

In other words, as illustrated in FIG. 2A, in a locked state of the pivot mechanism main body 25a, the top portion of the pivot mechanism main body 25a projecting from the outer cylinder 251 serves as a pivot point about which the swing arm 20 (21) swings. Therefore, when the cam portion 18a (19a) presses down the cam follower 20a (21a) as the camshaft 18 (19) is rotated, the intake valve 14 (exhaust valve 15) is pressed down against the urging force of the return spring 16 (17), and the intake port 12 (exhaust port 13) is opened. Thus, an all-cylinder operation of the engine 2 can be performed when the pivot mechanism main body 25a is brought to a locked state for each of the first and fourth cylinders.

On the other hand, as illustrated in FIG. 2B, when the outer ends of the paired locking pins 252 are pressed by a hydraulic pressure, the locking pins 252 come close to each other against the spring force of the lock spring 253, and escape from the through-holes 251a into the inner side of the outer cylinder 251. This allows for the pivot mechanism main body 25a located above the locking pins 252 to move in the up-down direction (axis direction). In other words, the pivot mechanism main body 25a is brought to a lock released state.

As described above, when the pivot mechanism main body 25a is brought to a lock released state, the opening and closing operations of the intake valve 14 (exhaust valve 15) are stopped. Specifically, the urging force of the lost motion spring 254 is set smaller than the urging force of the return spring 16 (17) which urges the intake valve 14 (exhaust valve 15). Therefore, when the cam follower 20a (21a) is pressed down by the cam portion 18a (19a) in a lock released state of the pivot mechanism main body 25a, the top portion of the intake valve 14 (exhaust valve 15) serves as a pivot point about which the swing arm 20 (21) swings. Then, as illustrated in FIG. 2C, the pivot mechanism main body 25a is pressed down against the urging force of the lost motion spring 254. In this way, the intake valve 14 (exhaust valve 15) is kept in a closed state. Thus, it is possible to perform a reduced-cylinder operation of the engine 2 by setting the pivot mechanism main body 25a to a lock released state for each of the first and fourth cylinders.

<Description on Hydraulic Supply Device 1>

Figure 3:
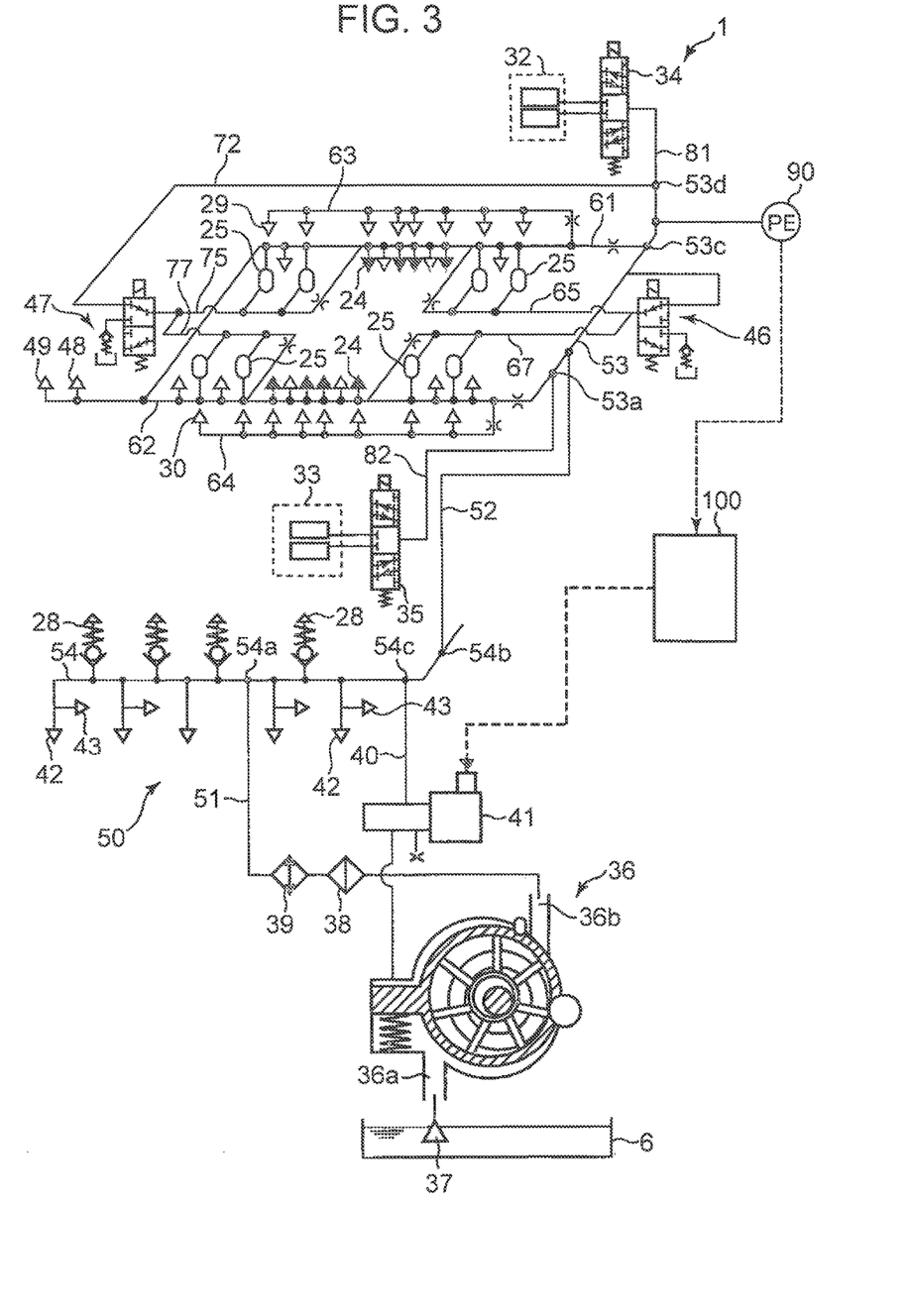
FIG. 3 is a hydraulic circuit diagram illustrating a schematic configuration of the hydraulic supply device.

Next, the hydraulic supply device 1 for supplying oil (hydraulic oil) to the engine 2 is described in details referring to FIG. 3 and FIG. 4. As illustrated in FIG. 3 and FIG. 4, the hydraulic supply device 1 is provided with an oil pump 36 to be driven by rotation of the crankshaft 9; and an oil supply passage 50 connected to the oil pump 36, and configured to introduce oil whose pressure is increased by the oil pump 36 to hydraulically actuated devices of the engine 2, and to an oil supply portion for a portion to be lubricated and for a portion to be cooled. The oil pump 36 is an auxiliary device to be driven by the engine 2.

The oil supply passage 50 is composed of pipes, and passages formed in the cylinder head 4, the cylinder block 5, and the like. The oil supply passage 50 is provided with a first communication passage 51 extending from the oil pump 36 to a branch point 54a in the cylinder block 5, the main gallery 54 extending from the branch point 54a in the cylinder array direction within the cylinder block 5, a second communication passage 52 extending from a branch point 54b on the main gallery 54 to the cylinder head 4, a third communication passage 53 extending in the cylinder head 4 in the engine width direction from the intake side to the exhaust side at the front end (end corresponding to the first cylinder side) of the cylinder head 4, and a plurality of oil passages branched from the third communication passage 53 and extending from the third communication passage 53, which will be described later.

The oil pump 36 is a well-known capacity variable oil pump configured such that the capacity of the oil pump 36 is changeable to make the oil ejection amount variable. The oil pump 36 ejects oil stored in the oil pan 6 to the first communication passage 51 through an oil ejection port 36b while pumping the oil through an oil suction port 36a via an oil strainer 37. An oil filter 38 and an oil cooler 39 are disposed in this order from the upstream side in the first communication passage 51. According to this configuration, oil ejected from the oil pump 36 is filtrated through the oil filter 38, cooled by the oil cooler 39, and introduced to the main gallery 54 within the cylinder block 5.

The oil pump 36 is connected to an oil passage 40. The oil passage 40 is branched from a branch point 54c on the main gallery 54, and is configured to introduce oil to a capacity-variable pressure chamber of the oil pump 36. A linear solenoid valve 41 is disposed in the oil passage 40. A flow rate of oil to be introduced to the capacity-variable pressure chamber is adjusted by the linear solenoid valve 41 so that the capacity of the oil pump 36 is changed.

The main gallery 54 is connected to the oil jet 28 which sprays cooling oil onto the back surface of the piston 8 of each cylinder, an oil supply portion 42 for metal bearings disposed on five main journals which pivotally support the crankshaft 9, and an oil supply portion 43 for metal bearings disposed on crank pins of the crankshaft 9 which rotatably connects between the connecting rods 10 of the cylinders. Oil is constantly supplied to the main gallery 54 during driving of the engine 2.

The cylinder head 4 is provided with the oil passage 61 (corresponding to a specific hydraulic oil supply passage of the invention) branched from the third communication passage 53 at a branch point 53c and extending in the cylinder array direction at a predetermined portion on the intake side, and the oil passage 62 (corresponding to a specific hydraulic oil supply passage of the invention) branched from the third communication passage 53 at a branch point 53a and extending in the cylinder array direction at a predetermined portion on the intake side. The oil passages 61 and 62 are disposed in parallel to each other.

The intake-side oil passage 61 is connected to oil supply portions 44 (see the hollow triangle marks Δ in FIG. 3 and FIG. 4) for lubricating cam journals of the intake-side camshaft 18, the HLAs 24 (see the solid triangle marks Δ in FIG. 3 and FIG. 4), and the valve-stopping-mechanism-mounted HLAs 25 (see the hollow oval marks in FIG. 3 and FIG. 4). The cylinder head 4 further includes an oil passage 63 branched at a branch point 61a of the oil passage 61 and extending in the cylinder array direction. The oil passage 63 is connected to the shower nozzles 29, each of which supplies lubricating oil to the corresponding intake-side swing arm 20. Oil is constantly supplied to the oil passages 61 and 63 during driving of the engine 2.

As well as the intake-side oil passage 61, the exhaust-side oil passage 62 is connected to oil supply portions 45 (see the hollow triangle marks Δ in FIG. 3 and FIG. 4) for lubricating cam journals of the exhaust-side camshaft 19, the HLAs 24 (see the solid triangle marks Δ in FIG. 3 and FIG. 4), and the valve-stopping-mechanism-mounted HLAs 25 (see the hollow oval marks in FIG. 3 and FIG. 4). The cylinder head 4 further includes the oil passage 64 branched at a branch point 62a of the oil passage 62 and extending in the cylinder array direction. The oil passage 64 is connected to the shower nozzles 30, each of which supplies lubricating oil to the corresponding exhaust-side swing arm 21. Oil is constantly supplied to the oil passages 62 and 64 during driving of the engine 2.

Figure 5:
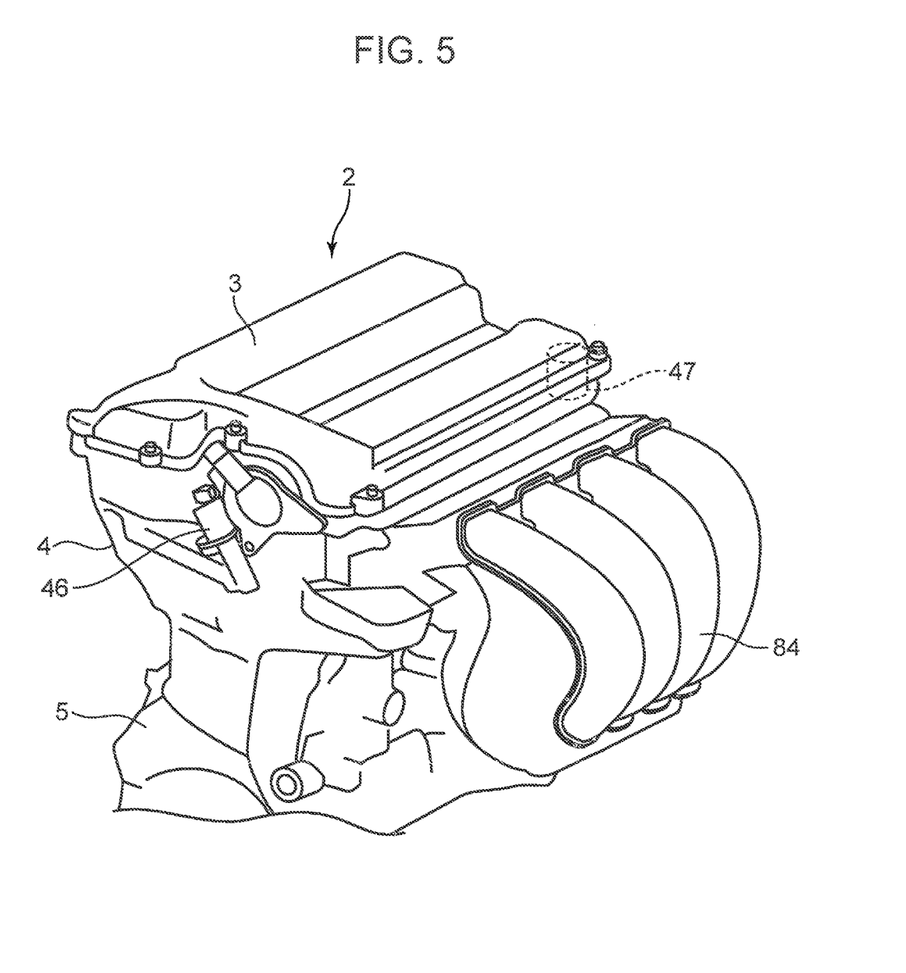
FIG. 5 is a perspective view of an engine for describing an arrangement of a first direction switching valve and a second direction switching valve.

The cylinder head 4 is provided with the oil passage 65 (corresponding to a valve stopping oil passage of the invention) disposed on the front side (right side in FIG. 3 and FIG. 4) and on the intake side in the width direction, extending in the cylinder array direction along the oil passage 61, and connected to the valve stopping mechanism 25b of the valve-stopping-mechanism-mounted HLA 25 on the intake-valve-14 side for the first cylinder, and the oil passage 67 (corresponding to a valve stopping oil passage of the invention) branched from the oil passage 65 toward the exhaust side, extending in the cylinder array direction, and connected to the valve stopping mechanism 25b of the valve-stopping-mechanism-mounted HLA 25 on the exhaust-valve-15 side for the first cylinder. The front end of the oil passage 65 is connected to an oil passage 70 branched from the third communication passage 53 at a branch point 53b via a first direction switching valve 46 (corresponding to a control valve of the invention). Oil supply and stopping of oil supply to each of the valve stopping mechanisms 25b for the first cylinder are performed by controlling a switching operation of the first direction switching valve 46. As illustrated in FIG. 5, the first direction switching valve 46 is fixed to the front wall of the cylinder head 4 of the engine 2, for instance. In FIG. 5, the reference sign 84 denotes an intake manifold of the engine 2.

As illustrated in FIG. 1, the intake-side oil passage 65 is disposed below and in proximity to the oil passage 61. The oil passages 61 and 65 are connected to each other at a position between the first cylinder and the second cylinder via a communication passage 66 (corresponding to a communication oil passage of the invention) provided with a restrictor 66a. The configuration of the exhaust-side oil passage 67 is the same as described above. The oil passage 67 is disposed below and in proximity to the oil passage 62 (see FIG. 1). The oil passages 62 and 67 are connected to each other at a position between the first cylinder and the second cylinder via a communication passage 68 (corresponding to a communication oil passage of the invention) provided with a restrictor 68a.

Further, the cylinder head 4 is provided with the oil passage 75 (corresponding to a valve stopping oil passage of the invention) disposed on the rear side (left side in FIG. 3 and FIG. 4) and on the intake side in the width direction, extending in the cylinder array direction along the oil passage 61, and connected to the valve stopping mechanism 25b of the valve-stopping-mechanism-mounted HLA 25 on the intake-valve-14 side for the fourth cylinder; and the oil passage 77 (corresponding to a valve stopping oil passage of the invention) branched from the oil passage 75 toward the exhaust side, extending in the cylinder array direction, and connected to the valve stopping mechanism 25b of the valve-stopping-mechanism-mounted HLA 25 on the exhaust-valve-15 side for the fourth cylinder. The rear end of the oil passage 75 is connected to an oil passage 72 via a second direction switching valve 47 (corresponding to a control valve of the invention). Oil supply and stopping of oil supply to each of the valve stopping mechanisms 25b for the fourth cylinder are performed by controlling a switching operation of the second direction switching valve 47. The oil passage 72 is branched at a branch point 53d on the third communication passage 53, extends in the cylinder array direction, and further extends in the engine width direction at a position near the rear end of the cylinder head 4. Further, as illustrated in FIG. 5, the second direction switching valve 47 is fixed to the rear wall of the cylinder head 4 of the engine 2.

As illustrated in FIG. 1, the intake-side oil passage 75 is disposed below and in proximity to the oil passage 61. The oil passages 61 and 75 are connected to each other at a position between the third cylinder and the fourth cylinder via a communication passage 76 (corresponding to a communication oil passage of the invention) provided with a restrictor 76a. The configuration of the exhaust-side oil passage 77 is the same as described above. The oil passage 77 is disposed below and in proximity to the oil passage 62 (see FIG. 1). The oil passages 62 and 77 are connected to each other at a position between the first cylinder and the second cylinder via a communication passage 78 (corresponding to a communication oil passage of the invention) provided with a restrictor 78a.

The oil passage 61 extending in the cylinder array direction on the intake side and the oil passage 62 extending in the cylinder array direction on the exhaust side are connected to each other via a communication passage 69, which is branched at the branch point 62a on the oil passage 62 at a position near the rear end of the cylinder head 4 (corresponding to the rear side of the fourth cylinder), and extends in the engine width direction. Further, an oil passage 79 is branched at the branch point 62a. The oil passage 79 is individually connected to an oil supply portion 48 for supplying lubricating oil to a bearing of a vacuum pump, and to an oil supply portion 49 for supplying lubricating oil to a journal of a fuel pump. The vacuum pump and the fuel pump correspond to an auxiliary device of the invention. The oil supply portions 48 and 49 correspond to an oil supply portion of the invention.

The reference sign 32 in FIG. 3 denotes an intake-valve-side VVT (variable valve timing mechanism) which changes valve characteristics (opening and closing timings) of the intake valves 14 by a hydraulic operation when the engine 2 is operated in an all-cylinder operation mode. The reference sign 33 denotes an exhaust-side VVT which changes valve characteristics of the exhaust valves 15 by a hydraulic operation. The intake-side VVT 32 is connected to an oil passage 81, which is branched at the branch point 53d on the third communication passage 53, via an intake-side direction switching valve 34. On the other hand, the exhaust-side VVT 33 is connected to an oil passage 82, which is branched at the branch point 53a on the third communication passage 53, via an exhaust-side direction switching valve 35. Controlling switching of the intake-side direction switching valve 34 allows for the intake-side VVT 32 to change the opening and closing timings of the intake valves 14, and controlling switching of the exhaust-side direction switching valve 35 allows for the exhaust-side VVT 33 to change the opening and closing timings of the exhaust valves 15.

The third communication passage 53 is further connected to a hydraulic pressure sensor 90. During driving of the engine 2, a hydraulic pressure of the oil supply passage 50 (third communication passage 53) is detected by the hydraulic pressure sensor 90, and a signal indicative of the detected hydraulic pressure is output to a controller 100.

Although not illustrated, oil to be supplied to the metal bearings which rotatably support the crankshaft 9, the cam journals which rotatably support the camshafts 18 and 19, the pistons 8, and the camshafts 18 and 19 for lubricating and cooling is allowed to drop into the oil pan 6 through an unillustrated drain oil passage after cooling and lubricating, and is returned by the oil pump 36.

The operation of the engine 2 is controlled by the controller 100. The controller 100 is a control device composed of a well-known microcomputer, and integrally controls the hydraulic pressures within the oil supply passage 50. The controller 100 receives detection signals from a hydraulic pressure sensor, a crank position sensor, an airflow sensor, an oil temperature sensor, a cam angle sensor, and a coolant temperature sensor, all of which are not illustrated, in addition to a detection signal from the hydraulic pressure sensor 90. The controller 100 determines the operation state of the engine 2 based on information to be obtained from the detection signals, and feedback controls the hydraulic pressure of the oil supply passage 50 (third communication passage 53) so that a highest required hydraulic pressure among the required hydraulic pressures of the hydraulically actuated devices such as the valve-stopping-mechanism-mounted HLAs 25, and the VVTs 32 and 33 is set as a target hydraulic pressure, based on a pre-stored map or the like. Specifically, the controller 100 controls the linear solenoid valve 41 in such a manner that the target hydraulic pressure is obtained based on a detection pressure by the hydraulic pressure sensor 90.

<Advantageous Effects of Hydraulic Supply Device 1>

In the hydraulic supply device 1, during driving of the engine 2, oil stored in the oil pan 6 is introduced to the third communication passage 53 via the first communication passage 51, the main gallery 54, and the second communication passage 52 while being pumped by actuating the oil pump 36.

Oil introduced to the third communication passage 53 is further introduced to the oil passages 61, 62, 70, 72, 81, and 82. In this way, when oil is introduced to the oil passage 61 (62), the oil is supplied to each of the intake-side HLAs 24 and 25 (exhaust-side HLAs 24 and 25) for each cylinder (to the pivot mechanism main body 25a in the case of the HLA 25). Thus, the valve clearance of the intake valve 14 (exhaust valve 15) is automatically adjusted to zero. In this example, the hydraulic pressure (required hydraulic pressure) of each of the HLAs 24 and 25 (pivot mechanism main body 25a in the case of the HLA 25) is set lower than the target hydraulic pressure. Therefore, oil is depressurized to a predetermined hydraulic pressure as the oil is introduced from the third communication passage 53 via a restrictor 611 (621) provided in the oil passage 61i (62).

When the engine 2 is operated in an all-cylinder operation mode, the first direction switching valve 46 and the second direction switching valve 47 are controlled so that the oil passage 65 (67) is disconnected from the oil passage 70, and the oil passage 75 (77) is disconnected from the oil passage 72 (specifically, valve control is performed to attain the state opposite to the state illustrated in FIG. 1). In this state, oil of such a level that the valve stopping mechanism 25b of each of the intake-side HLAs 25 and the exhaust-side HLAs 25 is not actuated is supplied to the valve stopping mechanisms 25b via the communication passage 66 (76) provided with the restrictor 66a (76a) and via the communication passage 68 (78) provided with the restrictor 68a (78a) to keep a predetermined hydraulic pressure, and the valve stopping mechanisms 25b are brought to a stopped state. Specifically, the pivot mechanism main bodies 25a are kept in a locked state (the state illustrated in FIG. 2A), and the intake valves 14 and the exhaust valves 15 are operated, as the camshafts 18 and 19 are rotated.

On the other hand, when the engine 2 is operated in a reduced-cylinder operation mode, specifically, when the first cylinder and the fourth cylinder are deactivated, the first direction switching valve 46 and the second direction switching valve 47 are controlled in such a manner that the oil passage 65 (67) and the oil passage 70 are communicated with each other, and the oil passage 75 (77) and the oil passage 72 are communicated with each other (valve control is performed to attain the state illustrated in FIG. 1). As a result, oil is supplied to the valve stopping mechanism 25b of each of the intake-side HLAs 25 and the exhaust-side HLAs 25, and the valve stopping mechanisms 25b are brought to an operated state. Specifically, the pivot mechanism main bodies 25a are brought to a lock released state (the state illustrated in FIG. 2B), and the operations of the intake valves 14 and the exhaust valves 15 are stopped.

When the engine 2 is continued to be operated in an all-cylinder operation mode for a long period of time, the amount of oil in the oil passages 65 and 67 and in the oil passages 75 and 77 may decrease, as time lapses. Specifically, the amount of oil in the oil passages 65 and 67 and in the oil passages 75 and 77 may decrease due to flow of oil to the drain oil passage through the first and second direction switching valves 46 and 47. As a result, the valve stopping mechanism 25b may cause a response delay when the engine 2 is shifted from an all-cylinder operation mode to a reduced-cylinder operation mode. However, as described above, the intake-side oil passage 65 (75) is connected to the oil passage 61 via the communication passage 66 (76) provided with the restrictor 66a (76a) Likewise, the exhaust-side oil passage 67 (77) is connected to the oil passage 62 via the communication passage 68 (78) provided with the restrictor 68a (78a). This is advantageous in preventing occurrence of the aforementioned drawback. Specifically, during an all-cylinder operation of the engine 2, oil is gradually introduced in the oil passages 65 (75) from the high-pressure-side oil passage 61 through the restrictor 66a (76a) of the communication passage 66 (76). As a result, the oil passage 65 (75) is constantly filled with oil. Likewise, oil is gradually introduced in the exhaust-side oil passage 67 (77) from the passage 62 through the restrictor 68a (78a) on the communication passage 68 (78). As a result, the oil passage 67 (77) is constantly filled with oil. Therefore, when the engine 2 is shifted from an all-cylinder operation mode to a reduced-cylinder operation mode, as the first direction switching valve 46 and the second direction switching valve 47 are switched, a hydraulic pressure is promptly applied to the valve stopping mechanism 25b of each of the HLAs 25. Thus, the valve stopping mechanisms 25b are promptly operated. Therefore, according to the hydraulic supply device 1, it is possible to switch the operation mode from an all-cylinder operation mode to a reduced-cylinder operation mode i.e. operate the valve stopping mechanisms 25b with enhanced responsiveness.

In particular, an oil passage structure for the valve stopping mechanism 25b of the HLA 25 for the first cylinder is such that the oil passage 65 (67) extending from the front end of the cylinder head 4 in the cylinder array direction is formed and the first direction switching valve 46 to be connected to the oil passage 65 is fixed to the front end of the cylinder head 4. Further, an oil passage structure for the valve stopping mechanism 25b of the HLA 25 for the fourth cylinder is such that the oil passage 75 (77) extending from the rear end of the cylinder head 4 in the cylinder array direction is formed and the second direction switching valve 47 to be connected to the oil passage 75 is fixed to the rear end of the cylinder head 4. Therefore, the oil passage length from each of the first and second direction switching valves 46 and 47 to each of the valve stopping mechanisms 25b is relatively short. This makes it possible to fill the oil passage 65 (67) and the oil passage 75 (77) relatively easily with oil introduced through the communication passage 66 (68) and through the communication passage 76 (78). Further, it is possible to operate each of the valve stopping mechanisms 25b promptly in response to control of each of the first and second direction switching valves 46 and 47. Thus, also in this aspect, the aforementioned configuration is advantageous in increasing the operation responsiveness of the valve stopping mechanisms 25b.

Furthermore, in the hydraulic supply device 1, the first-cylinder-side oil passage structure including the first direction switching valve 46, and the fourth-cylinder-side oil passage structure including the second direction switching valve 47 are the same as each other. This is advantageous in making the operation responsiveness substantially equal to each other between the first-cylinder-side valve stopping mechanism 25b and the fourth-cylinder-side valve stopping mechanism 25b. Specifically, the first-cylinder-side oil passage structure is such that the oil passage 65 for supplying oil to the intake-side valve stopping mechanism 25b is connected to the first direction switching valve 46, and the oil passage 67 for supplying oil to the exhaust-side valve stopping mechanism 25b is branched from the oil passage 65. Also, the fourth-cylinder-side oil passage structure is such that the oil passage 75 for supplying oil to the intake-side valve stopping mechanism 25b is connected to the second direction switching valve 47, and the oil passage 78 for supplying oil to the exhaust-side valve stopping mechanism 25b is branched from the oil passage 75. Therefore, there is no or less difference in hydraulic pressure to be applied between the first-cylinder-side valve stopping mechanism 25b, and the fourth-cylinder-sider valve stopping mechanism 25b in switching the first direction switching valve 46 and the second direction switching valve 47. This makes it possible to keep the operation responsiveness of the first-cylinder-side valve stopping mechanism 25b, and the operation responsiveness of the fourth-cylinder-side valve stopping mechanism 25b substantially equal to each other.

In the aforementioned configuration, in which each of the oil passages 65 and 75 (67 and 77) is connected to the oil passage 61 (62) via the communication passages 66 and 76 (68 and 78), when the engine 2 is left in a stopped state for a long period of time, air may stagnate in each of the oil passages 61, 65, and 75 (62, 67, and 77) and in the communication passages 66 and 76 (68 and 78) by return oil or the like. In such a condition, when the engine 2 is driven, and oil is introduced to the oil passage 61 (62), the air stagnated in the oil passage 61 (62) is introduced into each of the oil passages 65 and 75 (67 and 77) via each of the communication passages 66 and 76 (68 and 78), and is sharply pressurized. As a result, the valve stopping mechanism 25b of each of the valve-stopping-mechanism-mounted HLAs 25 may be pneumatically operated by the air pressure, regardless that the engine 2 is in an all-cylinder operation mode. In other words, the valve stopping mechanism 25b may be erroneously operated. Unlike the aforementioned configuration, as described above, the hydraulic supply device 1 is configured such that the oil passage 61 is jointed to the oil passage 62 via the communication passage 69, and the oil passage 62 is connected to the oil supply portion 48 for supplying lubricating oil to the vacuum pump and to the oil supply portion 49 for supplying lubricating oil to the fuel pump via the oil passage 79. Therefore, the air stagnated in each of the oil passages 61 and 62 is pressingly fed to the oil supply portion 48 and 49 by the hydraulic pressure, as oil is introduced to the oil passage 61 (62), and is released to the outside from the oil supply portion 48 and 49. This makes it possible to eliminate an increase in hydraulic pressure due to intrusion of air stagnated in the oil passage 61 (62) into each of the oil passages 65 and 75 (67 and 77) through the communication passages 66 and 76 (68 and 78). Thus, it is possible to prevent an erroneous operation of the valve stopping mechanisms 25b as described above. In particular, in this example, the intake-side oil passage 65 (75) is disposed below the oil passage 61. Likewise, the exhaust-side oil passage 67 (77) is disposed below the oil passage 62 (see FIG. 1). According to this configuration, it is possible to suppress intrusion of air stagnated in the oil passage 61 (62) into the oil passages 65 and 75 (67 and 77). This makes it possible to perform air bleeding in a satisfactory manner, as oil is introduced to the oil passage 61 (62). Also in this point, the embodiment contributes to preventing an erroneous operation of the valve stopping mechanisms 25b. In this example, as compared with the amount of air stagnated in the oil passage 61 (62), the amount of air stagnated in the communication passages 66 and 76 (68 and 78), and in each of the oil passages 65 and 75 (67 and 77) is small. Therefore, an operation of the valve stopping mechanisms 25b is hardly affected even if the air remains in the communication passages 66 and 76 (68 and 78), and in each of the oil passages 65 and 75 (67 and 77).

Further, the hydraulic supply device 1 has the following advantages in the aspect of structure of the engine 2 and in the aspect of manufacturing the engine 2. Specifically, as described above, in the hydraulic supply device 1, an oil passage structure for the valve stopping mechanism 25b of the HLA 25 for the first cylinder is such that the oil passage 65 (67) extending from the front end of the cylinder head 4 in the cylinder array direction is formed and the first direction switching valve 46 to be connected to the oil passage 65 is fixed to the front end of the cylinder head 4. Further, an oil passage structure for the valve stopping mechanism 25b of the HLA 25 for the fourth cylinder is such that the oil passage 75 (77) extending from the rear end of the cylinder head 4 in the cylinder array direction is formed and the second direction switching valve 47 to be connected to the oil passage 75 is fixed to the rear end of the cylinder head 4. According to the oil passage structure as described above, the oil passage 65 (67) and the oil passage 75 (77) are short passages independent of each other. Therefore, it is possible to easily form each of the oil passages 65 (67) and 75 (77) from both ends of the cylinder head 4 with use of a relatively short and sharp drill. This is advantageous in enhancing the productivity of the cylinder head 4. Further, the first direction switching valve 46 and the second direction switching valve 47 are disposed on the opposite sides i.e. on the front side and the rear side of the cylinder head 4. This is advantageous in avoiding constraints on the position of each of the first and second direction switching valves 46 and 47, and in increasing the degree of freedom in layout of each of the first and second direction switching valves 46 and 47. Further, the embodiment is advantageous in securing weight balance in the front-rear direction of the engine 2, in other words, in suppressing vibrations of the engine 2.

<Other Configurations>

The hydraulic supply device 1 is an example of a preferred embodiment of the inventive hydraulic supply device for a valve stopping mechanism. It is possible to modify the configuration of the hydraulic supply device 1 as far as the modification does not depart from the gist of the invention.

For instance, in the embodiment, the hydraulic supply device 1 is configured such that the oil passages 65 and 75 (67 and 77) for supplying oil to the valve stopping mechanisms 25b of the valve-stopping-mechanism-mounted HLAs 25 are connected to the oil passage 61 (62) for supplying oil to the HLAs 24 and 25 (to the pivot mechanism main body 25a in the case of the HLA 25) via the communication passages 66 and 76 (68 and 78). Alternatively, the connection destination of the oil passages 65 and 75 (67 and 77) may be an oil passage through which oil is allowed to enter into the oil passages 65 and 75 (67 and 77) during an all-cylinder operation of the engine 2, in other words, an oil passage other than the oil passage 61 (62), as far as the oil passage is an oil passage for constantly supplying oil.

Figure 6:
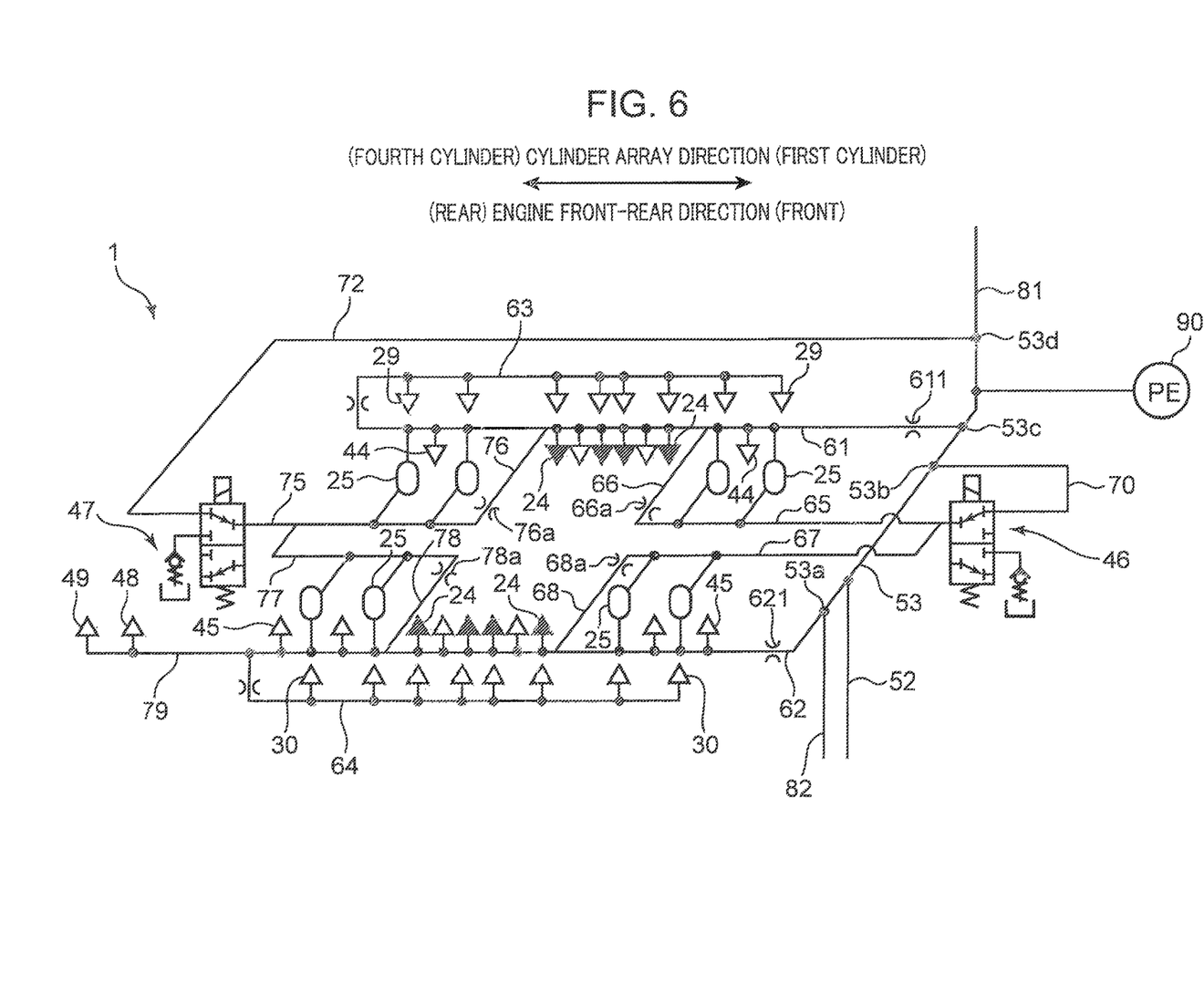
FIG. 6 is a hydraulic circuit diagram illustrating a modification of the hydraulic supply device.

Further, in the example of FIG. 3 and FIG. 4, the intake-side oil passage 61 is connected to the exhaust-side oil passage 62 via the communication passage 69 so that air stagnated in the oil passage 61 is released to the oil supply portions 48 and 49 through the communication passage 69, the oil passage 62 and the oil passage 79. Alternatively, as illustrated in FIG. 6, the communication passage 69 may be omitted, and the oil passage 63 for supplying oil to the intake-side shower nozzle 29 may be connected to the rear end of the oil passage 61 (end corresponding to the rear portion of the engine), and the oil passage 64 for supplying oil to the exhaust-side shower nozzle 30 may be connected to the rear end of the oil passage 62. In other words, air stagnated in the oil passage 61 (62) may be released together with oil from the shower nozzles 29 (30). The aforementioned configuration also makes it possible to suppress an erroneous operation of the valve stopping mechanisms 25b, as well as the configuration of FIG. 3 and FIG. 4. In the example illustrated in FIG. 6, the camshafts 18 and 19 (cam portions 18a and 19a), and the swing arms 20 and 21 (cam followers 20a and 21a) of the engine 2 correspond to a dynamic valve mechanism of the invention. The shower nozzles 29 and 30 correspond to an example of an oil supply portion (oil supply nozzle) of the invention.

Further, in the embodiment, the hydraulic supply device 1 for an in-line 4-cylinder engine is described. It is needless to say that the invention is also applicable to an in-line 3-cylinder engine or to an in-line 6-cylinder engine.

The following is a summary of the features of the invention.

A hydraulic supply device for a valve stopping mechanism of the invention includes a specific hydraulic oil supply passage which constantly supplies hydraulic oil during driving of an engine; a valve stopping mechanism incorporated in a cylinder head of the engine, and configured to stop at least one of an intake valve and an exhaust valve by a hydraulic operation; a valve stopping oil passage which supplies hydraulic oil to the valve stopping mechanism; a control valve which controls the supply of hydraulic oil to the valve stopping oil passage during driving of the engine; and a communication oil passage which communicates between the valve stopping oil passage and the specific hydraulic oil supply passage, and provided with a restrictor therebetween. The specific hydraulic oil supply passage is connected to an oil supply portion for a portion to be lubricated or for a portion to be cooled in the engine at a position downstream of a connection position with respect to the communication oil passage in an oil supply direction.

In the hydraulic supply device, during driving of the engine, hydraulic oil is supplied to the valve stopping oil passage, and the valve stopping mechanism is hydraulically operated. On the other hand, when the operation of the valve stopping mechanism is stopped, hydraulic oil intrudes into the valve stopping oil passage from the specific hydraulic oil supply passage through the restrictor provided in the communication oil passage. Thus, the valve stopping oil passage is filled with hydraulic oil while the stopped state of the valve stopping mechanism is maintained. In other words, during driving of the engine, the valve stopping oil passage is constantly filled with hydraulic oil. Therefore, when the control valve is opened, a hydraulic pressure necessary for the valve stopping mechanism is promptly applied. This makes it possible to operate the valve stopping mechanisms with enhanced responsiveness. Further, even when the engine is left in a stopped state for a long period of time, and air may stagnate in the specific hydraulic oil supply passage, when hydraulic oil is introduced to the specific hydraulic oil supply passage after the engine is driven, the air is released from the oil supply portion toward the portion to be lubricated or toward the portion to be cooled. In other words, it is possible to perform air bleeding in a satisfactory manner. This makes it possible to avoid in advance a drawback such that air stagnated in the specific hydraulic oil supply passage may be pressingly fed to the valve stopping oil passage through the communication oil passage by the hydraulic pressure, and the valve stopping mechanism may be erroneously operated due to the air pressure.

When the engine is provided with an auxiliary device to be driven by a camshaft of the engine, preferably, the oil supply portion may be configured to supply oil to the portion to be lubricated in the auxiliary device.

According to the aforementioned configuration, it is possible to perform air bleeding in the specific hydraulic oil supply passage in a satisfactory manner, while securing lubrication of the portion to be lubricated in the auxiliary device.

Further, preferably, the engine may be provided with a dynamic valve mechanism which actuates the intake valve and the exhaust valve, and the oil supply portion may be an oil supply nozzle which supplies oil to the dynamic valve mechanism serving as the portion to be cooled.

According to the aforementioned configuration, it is possible to perform air bleeding in the specific hydraulic oil supply passage in a satisfactory manner, while securing lubrication of the dynamic valve mechanism.

Preferably, the cylinder head of the engine may be provided with a hydraulic lash adjuster which adjusts a valve clearance of each of the intake valve and the exhaust valve to zero, and the specific hydraulic oil supply passage may be configured to supply hydraulic oil to the lash adjuster for at least one of the intake valve and the exhaust valve.

In other words, the lash adjuster is constantly and hydraulically operated during driving of the engine, and is disposed near the intake valve (exhaust valve). According to the aforementioned configuration, it is possible to smoothly fill the valve stopping oil passage with hydraulic oil, using hydraulic oil to be supplied to the lash adjuster.

In the aforementioned configuration, preferably, the specific hydraulic oil supply passage may extend substantially horizontally in a cylinder array direction of the engine, and the valve stopping oil passage may be formed along the specific hydraulic oil supply passage at a position below the specific hydraulic oil supply passage.

According to the aforementioned configuration, it is possible to keep air stagnated in the specific hydraulic oil supply passage from intruding into the valve stopping oil passage. This makes it possible to perform air bleeding in a satisfactory manner, as hydraulic oil is introduced to the specific hydraulic oil supply passage.

The invention claimed is:

1. A hydraulic supply device for a valve stopping mechanism in an engine, comprising:

an oil pump included in the engine and serving as an auxiliary device to be driven by a camshaft;
a primary hydraulic supply passage connected to the oil pump;
a specific hydraulic oil supply passage directly connected to the primary hydraulic supply passage at a position downstream thereof for constantly supplying hydraulic oil having a first hydraulic pressure during driving of the engine;
a valve stopping mechanism incorporated in a cylinder head of the engine, and configured to stop at least one of an intake valve and an exhaust valve by a hydraulic operation;
a hydraulic lash adjuster incorporated in the cylinder head of the engine, and configured to adjust a valve clearance of an intake valve and of an exhaust valve to zero, the intake valve and the exhaust valve being different from the intake valve and the exhaust valve whose operation is stopped by the valve stopping mechanism;
a control valve connected to a control oil passage that is branched from the primary hydraulic supply passage at a position upstream of a connection position between the primary hydraulic supply passage and the specific hydraulic oil supply passage in a first oil supply direction and is connected to a valve stopping oil passage, the control valve controlling switching between supply and stop of the hydraulic oil from the primary hydraulic supply passage to the valve stopping oil passage via the control oil passage during the driving of the engine in such a manner as to stop the valve by supplying the hydraulic oil having a second hydraulic pressure that is higher than the first hydraulic pressure during operation of the valve stopping mechanism, while stopping the supply of the hydraulic oil to the valve stopping oil passage during no operation of the valve stopping mechanism;
a communication oil passage that communicates between the valve stopping oil passage and the specific hydraulic oil supply passage, and provided with a first restrictor therebetween to depressurize oil in the first supply direction;
a second restrictor provided at a position downstream of a branch point at which the control oil passage is branched from the primary hydraulic supply passage to the control oil passage in a second oil supply direction and upstream of a connection position of the hydraulic lash adjuster with respect to the specific hydraulic oil supply passage in the second oil supply direction, wherein
the specific hydraulic oil supply passage is connected to an oil supply portion for a portion to be lubricated or for a portion to be cooled in the engine at a position downstream of a connection position with respect to the communication oil passage in the first and the second oil supply direction.

2. The hydraulic supply device for a valve stopping mechanism according to claim 1, wherein
the oil supply portion is configured to supply oil to a portion to be lubricated in the auxiliary device.

3. The hydraulic supply device for a valve stopping mechanism according to claim 1, wherein
the engine is provided with a dynamic valve mechanism which actuates the intake valve and the exhaust valve, and
the oil supply portion is an oil supply nozzle which supplies oil to the dynamic valve mechanism serving as the portion to be cooled.

4. The hydraulic supply device for a valve stopping mechanism according to claim 1, wherein
the specific hydraulic oil supply passage extends substantially horizontally in a cylinder array direction of the engine, and
the valve stopping oil passage is formed along the specific hydraulic oil supply passage at a position below the specific hydraulic oil supply passage.

5. The hydraulic supply device for a valve stopping mechanism according to claim 1, wherein
the engine is a multi-cylinder engine, and is configured to be switchable between an all-cylinder operation in which intake valves and exhaust valves of all the cylinders are operated, and a reduced-cylinder operation in which the intake valve and the exhaust valve of a portion of the cylinders are operated.

6. The hydraulic supply device for a valve stopping mechanism according to claim 1, wherein the second restrictor is a fixed orifice.

* * * * *